(12) United States Patent
Yoon et al.

(10) Patent No.: US 8,729,481 B2
(45) Date of Patent: May 20, 2014

(54) RADIATION DIAGNOSIS APPARATUS

(75) Inventors: Hyun Suk Yoon, Yongin (KR); Jae Sung Lee, Seoul (KR)

(73) Assignee: SNU R&DB Foundation, Seoul (KR)

( * ) Notice: Subject to any disclaimer, the term of this patent is extended or adjusted under 35 U.S.C. 154(b) by 84 days.

(21) Appl. No.: 13/468,188

(22) Filed: May 10, 2012

(65) Prior Publication Data

US 2013/0119262 A1    May 16, 2013

(30) Foreign Application Priority Data

Nov. 11, 2011  (KR) ......................... 10-2011-0117720

(51) Int. Cl.
*G01T 1/20* (2006.01)
*G01T 1/24* (2006.01)
*G01N 23/00* (2006.01)

(52) U.S. Cl.
USPC ................ 250/366; 250/370.09; 250/363.07; 250/363.09; 250/361 R; 250/394; 378/4; 378/5

(58) Field of Classification Search
USPC .............................. 250/366, 370.09; 378/4, 5
See application file for complete search history.

(56) References Cited

U.S. PATENT DOCUMENTS 5,532,491 A * 7/1996 Hassler et al. ............ 250/370.09
2008/0017803 A1* 1/2008 Zhang et al. ................... 250/366

FOREIGN PATENT DOCUMENTS

JP    2006-288911    10/2006
JP    2009-050640    3/2009

OTHER PUBLICATIONS

Hyun Suk Yoon et al., Analog Signal Multiplexing of PET Block Detectors for Axial Length Extension, The Korea Society of Medical and Biological Engineering, May 13, 2011.

* cited by examiner

*Primary Examiner* — David Porta
*Assistant Examiner* — Jeremy S Valentiner
(74) *Attorney, Agent, or Firm* — Lexyoume IP Meister, PLLC

(57) ABSTRACT

A radiation diagnosis apparatus, which employs a reduced number of data acquisition units while showing the same effect as that of the related art (PET, SPECT or x-ray CT) includes: a first radiation detector; a second radiation detector an inverter formed at an output terminal of the first radiation detector; a discriminator for receiving a common signal from the first and second radiation detector and outputting a control signal corresponding to the input common signal; and a data acquisition unit and indentifying an output signal of which detector of the first and second detectors the input signal is according to a polarity difference of the input signal, to provide a radiation diagnosis apparatus which employs a reduced number of data acquisition units while showing the same effect as that of the related art.

22 Claims, 7 Drawing Sheets

RADIATION DIAGNOSIS APPARATUS

CROSS-REFERENCE TO RELATED APPLICATION

This application claims priority to and the benefit of Korean Patent Application No. 10-2011-0117720 filed in the Korean Intellectual Property Office on Nov. 11, 2011, the entire contents of which are incorporated herein by reference.

BACKGROUND OF THE INVENTION (a) Field of the Invention

The present invention relates to a radiation diagnosis apparatus. More particularly, the present invention relates to a radiation diagnosis apparatus including a plurality of radiation detectors for outputting signals of a single polarity.

(b) Description of the Related Art

In general, a radiation diagnosis apparatus employs a radiation detector for detecting a radiation. A radiation includes a gamma ray emitted when a radio isotope is changed while an atomic nucleus thereof remains stable, and an X-ray emitted when an electron collides with an object at a high speed. In this case, the radiation detector detects an emitted radiation.

A representative example of such a radiation diagnosis apparatus includes a positron emission tomography (PET) apparatus, a single photon emission computed tomography (SPECT) apparatus, an X-ray computed tomography (X-ray CT) apparatus, and the like. Of course, such radiation diagnosis apparatuses are used in all fields, such as nuclear facilities and nuclear engineering as well as medical fields, where radiations are emitted.

As shown in FIG. 1, in a radiation diagnosis apparatus according to the related art, all radiation detectors are connected to data acquisition units, respectively such that one data acquisition unit corresponds to an output of each radiation detector.

FIG. 1 is a schematic diagram of a radiation diagnosis apparatus according to the related art. FIG. 1 shows only a relationship between two radiation detectors 10 and 20 and two data acquisition units 100 as an example.

That is, as shown in FIG. 1, an output of a first radiation detector 10 is input to one data acquisition unit 100, and an output of a second radiation detector 20 is input to another data acquisition unit 100. Each of the data acquisition units 100 is connected to a computer for signal processing and analysis.

However, in the radiation diagnosis apparatus, since one radiation detector requires one data acquisition unit 100, data acquisition units 100 corresponding to the number of radiation detectors are necessary.

For this reason, the radiation diagnosis apparatus according to the related art has a drawback of a large volume, a heavy weight, and a high price.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a radiation diagnosis apparatus which employs a reduced number of data acquisition units while showing the same effect as that of the related art.

An exemplary embodiment of the present invention provides a radiation diagnosis apparatus according to an exemplary embodiment of the present invention. The radiation diagnosis apparatus includes: a first radiation detector for detecting a radiation and generating an output signal in response to the detection of the radiation; a second radiation detector for generating an output signal having a same polarity as that of the first radiation detector; an inverter formed at an output terminal of the first radiation detector to invert the polarity of the input output signal; a discriminator for receiving a common signal from the first and second radiation detector and outputting a control signal corresponding to the input common signal; and a data acquisition unit for converting an input signal to a digital signal according to the control signal while taking output signals of the plurality of inverters and the second radiation detector as inputs, and identifying an output signal of which detector of the first and second detectors the input signal is according to a polarity difference of the input signal.

Another exemplary embodiment of the present invention provides a radiation diagnosis apparatus. The radiation diagnosis apparatus includes: a first radiation detector for detecting a radiation and generating an output signal corresponding to the detection of the radiation; a second radiation detector for generating an output signal having a same polarity as that of the first radiation detector; an inverter formed at a common signal output terminal of the first radiation detector to invert the polarity of the input common signal; a bipolar discriminator for receiving a common signal from the inverter and the second radiation detector and outputting a control signal corresponding to a polarity difference of the input common signal; and a data acquisition unit for converting an input signal to a digital signal according to the control signal while taking output signals of the first and second radiation detectors as inputs, and identifying an output signal of which detector of the first and second detectors the input signal is according to a polarity difference of the common signal.

The first radiation detector and the second radiation detector may be situated at adjacent locations.

The data acquisition unit may be a data acquisition (DAQ) board.

The bipolar discriminator may be connected to the data acquisition unit through two signal lines to provide a control signal corresponding to a common signal of the first radiation detector whose polarity is inverted through one of the signal lines and provide a control signal corresponding to a common signal of the second radiation detector whose polarity is non-inverted through the other signal line.

If the DAQ board identifies a detector corresponding to the input signal, the DAQ board may contain identifying information representing the identified detector in the digital signal to output the identifying information.

Another exemplary embodiment of the present invention provides a radiation diagnosis apparatus. The radiation diagnosis apparatus includes: a first radiation detector for detecting a radiation and generating an output signal corresponding to the detection of the radiation; a second radiation detector for generating an output signal whose polarity is the same as that of the first radiation detector; a first inverter formed at a plurality of output terminals of the first radiation detector to invert the polarity of the input output signal; third and fourth radiation detectors for generating output signals whose polarity is the same as that of the first radiation detector; a second inverter formed at a plurality of output terminals of the third radiation detector to invert the polarity of the input output signal; a third inverter formed at a common signal output terminal of the first and second radiation detectors to invert the polarity of the common signal of the first and second radiation detectors; a bipolar discriminator for receiving a common signal from the third inverter and the third and fourth radiation detectors through one input terminal and outputting a control signal corresponding to a polarity difference of the input common signal; and a data acquisition unit for converting an input signal to a digital signal while taking output signals of the first and second inverters and the third and fourth radiation detectors, and identifying an output signal of which detector of the first to fourth radiation detectors the input signal is based on a polarity difference of the common signal and a polarity difference of the input signal.

At least two of the first to fourth radiation detectors may be situated at adjacent locations.

The exemplary embodiment of the present invention provides a light and inexpensive radiation diagnosis apparatus which employs a reduced number of data acquisition units while showing the same effect as that of the related art.

DETAILED DESCRIPTION OF THE EMBODIMENTS

Figure 1:
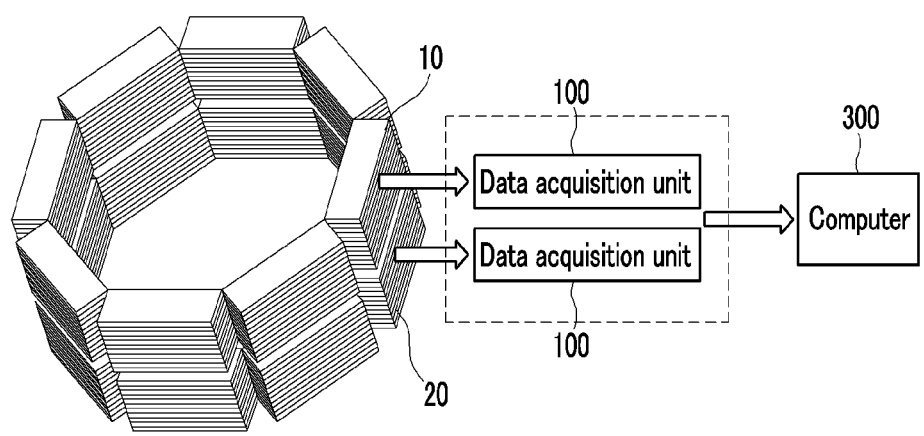
FIG. 1 is a schematic diagram of a radiation diagnosis apparatus according to the related art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Now, the radiation diagnosis apparatuses according to the exemplary embodiments of the present invention will be described in detail.

Figure 2:
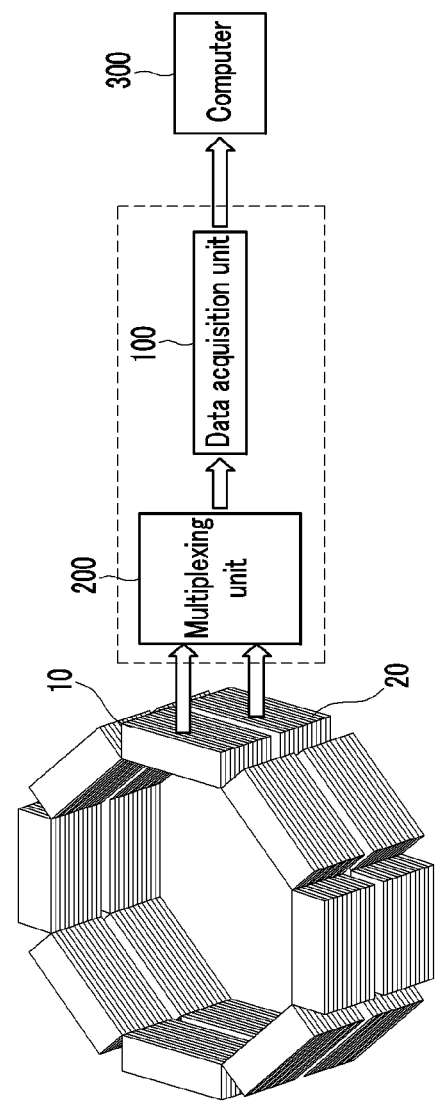
FIG. 2 is a schematic diagram of a radiation diagnosis apparatus according to an exemplary embodiment of the present invention.

FIG. 2 is a schematic diagram of a radiation diagnosis apparatus according to an exemplary embodiment of the present invention, and shows two radiation detectors 10 and 20 forming a pair as subject objects. Of course, two remaining ones of a plurality of radiation detectors constituting the radiation diagnosis apparatus according to the exemplary embodiment of the present invention form a pair, respectively so as to have the same forms as the two radiation detectors 10 and 20. That is, as shown in FIG. 2, two of the plurality of radiation detectors forms a pair, respectively.

As shown in FIG. 2, the radiation diagnosis apparatus according to the exemplary embodiment includes a plurality of radiation detectors having an arbitrary form, a multiplexing unit 200 for selectively providing an output signal of a radiation detector of the plurality of radiation detectors one by one while taking an output signal of the two radiation detectors of the plurality of radiation detectors forming a pair as an input signal, and a data acquisition unit for converting an analog signal which is the output signal of the radiation detector input from the multiplexing unit 200 to a digital signal to provide the digital signal to a computer 300.

The radiation detectors (including 10 and 20) constituting the radiation diagnosis apparatus according to the exemplary embodiment of the present invention detect gamma rays generated in the process of an unstable atomic nucleus turns into a stable state and an X-ray generated when an electron collides with an object at a high speed (that is, radiations).

In this case, the radiation detectors (including 10 and 20) have output signals of the same polarity due to detection of a radiation as in radiation detectors such as a photomultiplier tube (PMT) based detector, a cadmium zic telluride (CZT) based detector, an avalanche photo diode (APD) based detector, or a silicon photomultiplier (SiPM) based detector. That is, the radiation detectors (including 10 and 20) generate output signals of the same polarity.

The radiation detectors forming a pair may be set arbitrarily, but considering the design and wiring problems, they may be two upper and lower radiation detectors adjacent to each other or two left and right radiation detectors adjacent to each other. FIG. 2 shows two upper and lower radiation detectors adjacent to each other as an example.

The two radiation detectors 10 and 20 detect a radiation with a time gap, and accordingly, generate output signals with a time gap to provide the output signals to the multiplexing unit 200.

In this case, it has been described in the exemplary embodiment of the present invention with reference to FIG. 2 that the output signals of the two radiation detectors are taken as an input of the multiplexing unit 200, but the exemplary embodiment of the present invention is not limited thereto.

The reason will be easily described by those skilled in the art through the following description.

Now, a detailed example of the radiation diagnosis apparatus according to the exemplary embodiment of the present invention described with reference to FIG. 2 will be described with reference to FIGS. 3 and 4.

Figure 3:
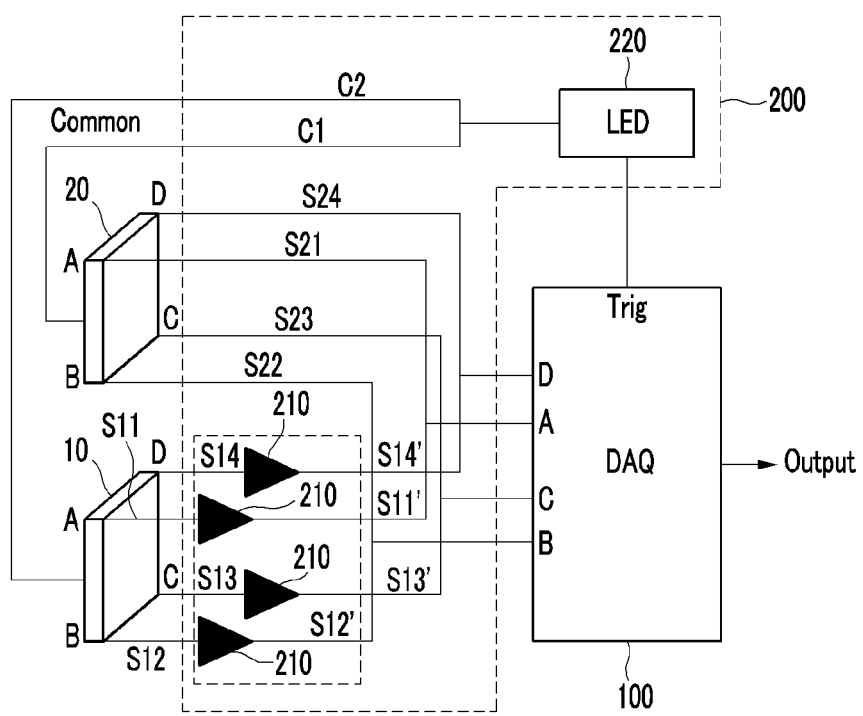
FIG. 3 is a detailed diagram of a radiation diagnosis apparatus according to a first exemplary embodiment of the present invention.

FIG. 3 is a detailed diagram of a radiation diagnosis apparatus according to a first exemplary embodiment of the present invention. For convenience' sake, two radiation detectors 10 and 20 forming a pair will be described as subject objects with reference to FIG. 3.

As shown in FIG. 3, the radiation diagnosis apparatus according to the first exemplary embodiment of the present invention includes first and second radiation detectors 10 and 20, a multiplexing unit 200 including a plurality of inverters 210 and one discriminator 220, and one data acquisition (DAQ) board 100.

The DAQ board 100 is an example of a data acquisition unit.

The first and second radiation detectors 10 and 20 generate radiation detection signals (that is, output signals) corresponding to four sites situated with respect to installation locations thereof, and the four output signals are output through A, B, C, and D output terminals, respectively.

The same output terminals of the first and second radiation detectors 10 and 20 are connected to each other, and are connected to input terminals of the DAQ board 100 through a common line, respectively. That is, the A output terminal of the same output terminals of the first and second radiation detectors 10 and 20 is connected to the A input terminal of the DAQ board 100, the B output terminal is connected to the B input terminal of the DAQ board 100, the C output terminal is connected to the C input terminal of the DAQ board 100, and the D output terminal is connected to the D input terminal of the DAQ board 100.

In this case, inverters 210 are installed in the output terminals of the first radiation detectors 10, respectively.

Hereinafter, an output signal output through the A output terminal of the first radiation detector 10 is denoted as S11, an output signal output through the B output terminal thereof is denoted as S12, an output signal output through the C output terminal thereof is denoted as S13, and an output signal output through the D output terminal thereof is denoted as S14.

Further, an output signal output through the A output terminal of the second radiation detector 20 is denoted as S21, an output signal output through the B output terminal thereof is denoted as S22, an output signal output through the C output terminal thereof is denoted as S23, and an output signal output through the D output terminal thereof is denoted as S24.

Since the first and second radiation detectors 10 and 20 generate output signals of the same polarity, S11 to S14 and S21 to S24 have the same polarity and the polarity of the output signals S11 to S14 of the first radiation detectors 10 is inverted by the inverter 210 to be input to the DAQ board 100. In this case, the signals of the first radiation detector 10 whose polarity has been inverted will be denoted as S11', S12', S13', and S14'.

The discriminator 220 generates a control signal synchronized with input of common signals c1 and c2 while taking the common signals c1 and c2 output from the first and second radiation detectors 10 and 20 as inputs, and inputs the control signal to the trigger terminal of the DAQ board 200. An example of such a discriminator 220 may include a leading edge discriminator (LED) or all types of discriminators which discriminates the input signal that exceeds certain threshold to output a control signal.

Here, the first and second radiation detectors 10 and 20 generate common signals c1 and c2 when a radiation is detected, that is, when an output signal is generated. In this case, since the first and second radiation detectors 10 and 20 have a time gap when a radiation is detected, the common signals c1 and c2 do not overlap each other.

The DAQ board 100 inputs the output signals S11' to S14' or S21 to S24 of the first and second radiation detector 10 through the four input terminals A, B, C, and D. In addition, the DAQ board 100 provides an output signal input according to a control signal input from a trigger terminal to the computer 300.

Thus, the DAQ board 100 sequentially converts the inverted signals S11' to S14' output from the first radiation detector 10 and the signals S21 to S24 output from the second radiation detector 20 to digital signals to output the digital signals.

The computer 300 determines a signal input from a specific DAQ board 100 as an output of the first radiation detector 10 if the input signal is an inverted signal, and determines the signal as an output of the second radiation detector 20 if the signal is not an inverted signal.

Of course, the DAQ board 100 identifies a radiation detector according to whether an input output signal is an inverted signal S11' to S14' or an non-inverted signal S21 to S24, and the identifying information of the radiation detector may be contained in a digital signal transmitted to the computer 300 to be transmitted.

Hereinafter, a radiation diagnosis apparatus according to a second exemplary embodiment of the present invention will be described with reference to FIG. 4. FIG. 4 is a detailed diagram of a radiation diagnosis apparatus according to a second exemplary embodiment of the present invention.

Figure 4:
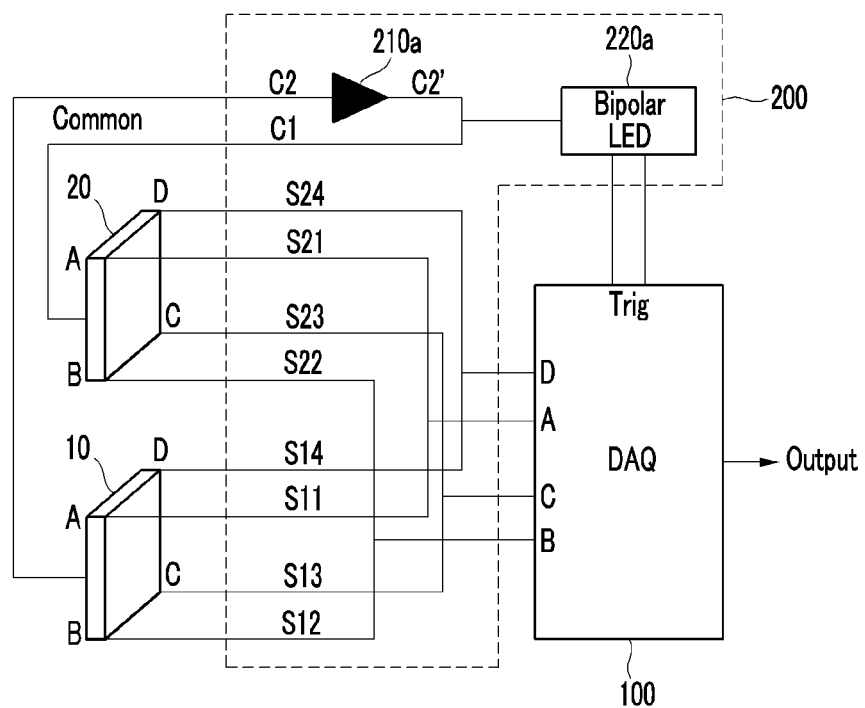
FIG. 4 is a detailed diagram of a radiation diagnosis apparatus according to a second exemplary embodiment of the present invention.

As shown in FIG. 4, the radiation diagnosis apparatus according to the second exemplary embodiment of the present invention includes first and second radiation detectors 10 and 20, a multiplexing unit 200 including one inverter 210a and one bipolar discriminator 220a, and one data acquisition (DAQ) board 100.

The first and second radiation detectors 10 and 20 are the same as the first and second radiation detectors 10 and 20 according to the first exemplary embodiment of the present invention shown in FIG. 3. Further, like in the first and second radiation detectors 10 and 20 according to the first exemplary embodiment of the present invention, the same output terminals of the first and second radiation detectors 10 and 20 are connected to each other and are connected to the input terminals of the DAQ board 100 through a common line.

However, an inverter is not installed in each of the output terminals of the first radiation detector 10.

A S11 output signal or S21 output signal is input to an A input terminal of the DAQ board 100, an S12 output signal or S22 output signal is input to a B input terminal thereof, an S13 output signal or S23 output signal is input to a C input terminal thereof, and an S14 output signal or S24 output signal is input to a D input terminal thereof.

The inverter 210a is installed on a common line of the first radiation detector 10 to invert the polarity of the common signal c1 to the polarity of the common signal c1'.

The bipolar discriminator 220a generates a control signal synchronized with input of common signals c1' and c2 while taking an inverted common signal c1' and a non-inverted common signal c2 input from the first and second radiation detectors 10 and 20 as inputs, and inputs the control signal to a trigger terminal of the DAQ board 200.

The bipolar discriminator 220a may be a bipolar leading edge discriminator (BLED) as an example, but the present invention is not limited thereto.

In this case, the bipolar discriminator 220a and the DAQ board 200 are connected to each other through two trigger signal lines, a control signal generated in response to the inverted common signal c1' is input to the first trigger terminal of the DAQ board 100 through one trigger signal line, and a control signal generated in response to the non-inverted common signal line c2 is input to the second trigger terminal of the DAQ board 100 through another trigger signal line.

If a control signal is input to the first trigger terminal, the DAQ board 100 recognizes the input signal as an output signal of the first radiation detector 10, and if a control signal is input to the second trigger terminal, and the DAQ board 100 recognizes the input signal as an output signal of the second radiation detector 20.

If the DAQ board 100 recognizes the first radiation detector 10 or the second radiation detector 20 according to the type of the trigger terminal to which a control signal is input, the DAQ board 100 generates identifying information for recognizing the first or second radiation detector 10 or 20 in a digitalizing process such that the input signal is contained in the identifying information.

Thus, if the output signals S11 to S14 or S21 to S24 of the first or second radiation detector 10 or 20 are input through the input terminals A, B, C, and D of the four signal lines and a control signal is input from one of the first and second trigger terminals, the DAQ board 100 contains identifying information representing whether the input signal is an output signal of the first radiation detector 10 or an output signal of the second radiation detector 20 while converting the input signal to a digital signal to provide the digital signal to the computer 300.

The computer 300 receives the digital signal input from the DAQ board 100 and determines whether the input digital signal is an output signal of the first radiation detector 10 or an output signal of the second radiation detector 20 through the identifying information contained in the digital signal.

Hereinafter, the radiation diagnosis apparatus according to a third exemplary embodiment of the present invention will be described with reference to FIG. 5.

Figure 5:
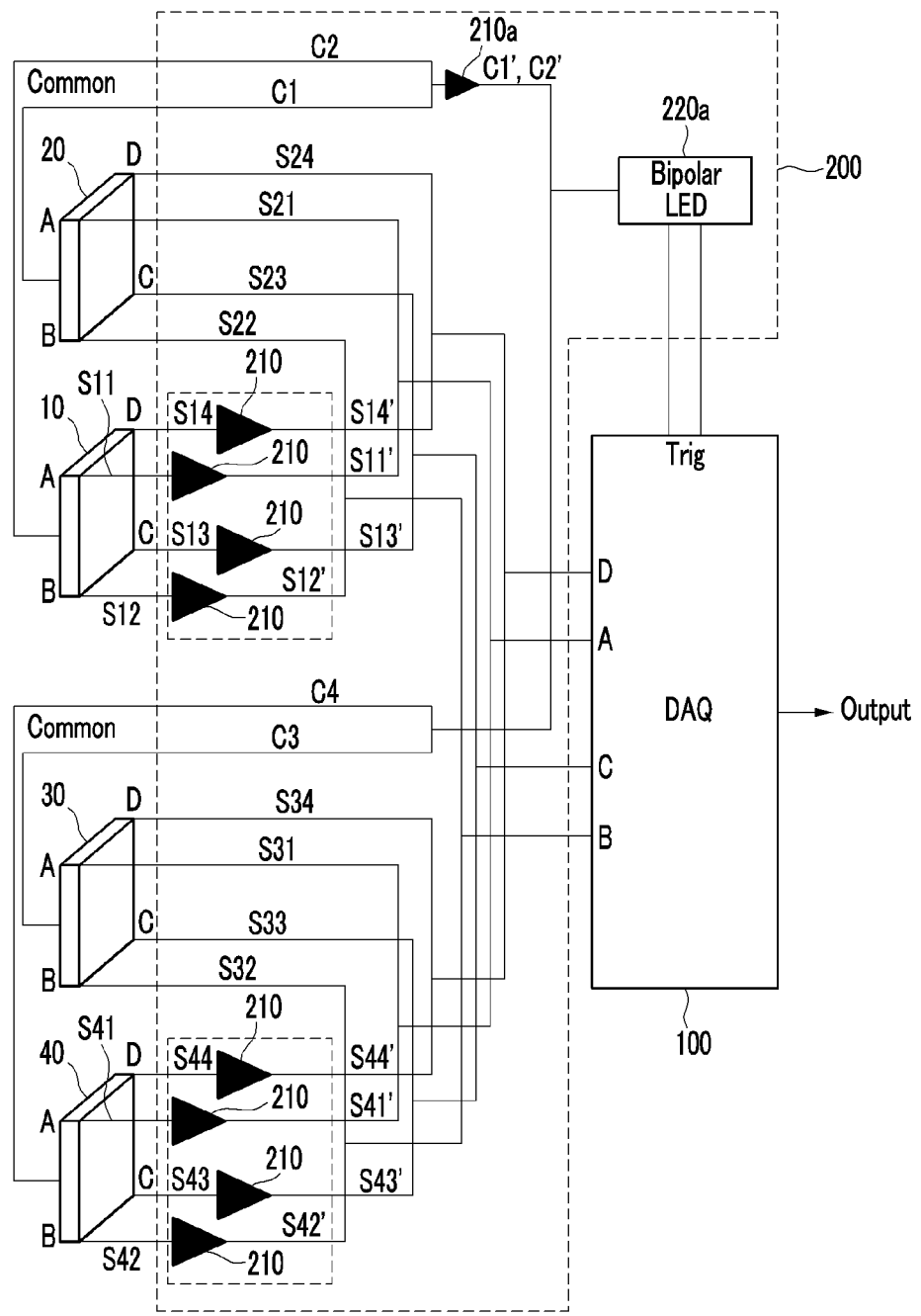
FIG. 5 is a detailed diagram of a radiation diagnosis apparatus according to a third exemplary embodiment of the present invention.

FIG. 5 is a detailed diagram of a radiation diagnosis apparatus according to a third exemplary embodiment of the present invention. As shown in FIG. 5, the radiation diagnosis apparatus according to the third exemplary embodiment of the present invention is configured such that outputs of two pairs of radiation detectors, that is, four radiation detectors (10 and 20 forms a pair and 30 and 40 forms a pair) are transmitted to a computer 300 through one data acquisition unit 100.

That is, the radiation diagnosis apparatus according to the third exemplary embodiment of the present invention includes four radiation detectors 10 to 40, a multiplexing unit 200 including a plurality of inverters 210 and 210a and a bipolar discriminator 220a, and one DAQ board 100.

Here, the two pairs (hereinafter, referred to as "group") coupled to the one data acquisition unit 100 may be set arbitrarily, but considering a design and wiring problem, they may be upper and lower pairs or left and right pairs adjacent to each other.

The inverter 210 is connected to output lines of the two radiation detectors forming a pair of the group. Thus, the pairs output output signals in the same structure as that of the first exemplary embodiment of the present invention. That is, one radiation detector 10 or 40 forming a pair outputs inverted signals S11' to S14' or S41' to S44' through the inverter 210, and the remaining radiation detector 20 or 30 forming the pair output non-inverted signals S21 to S24 or S31 to S34.

In this state, the same output terminals of the four radiation detectors 10 to 40 forming the group are connected to each other to be connected to an input terminal of one DAQ board 100, respectively.

That is, A output terminals of the first to fourth radiation detectors 10 to 40 are connected to each other to be connected to an A input terminal of the DAQ board 100, B output terminals thereof are connected to each other to be connected to a B input terminal of the DAQ board 100, C output terminals thereof are connected to each other to be connected to a C input terminal of the DAQ board 100, and D output terminals thereof are connected to each other to be connected to a D input terminal of the DAQ board 100, Thus, output signals of S11', S21, S31, and S41' are input to the A input terminal of the DAQ board 100, output signals of S12', S22, S32, and S42' are input to the B input terminal, output signals of S13', S22, S32, and S42' are input to the C input terminal, and output signals of S14', S24, S34, and S44' are input to the D input terminal.

Meanwhile, common signals c1 and c2 of the first and second radiation detectors 10 and 20 forming a pair are inverted through the inverter 210a to be input to the bipolar discriminator 220a, and common signals c3 and c4 of the third and fourth radiation detectors 30 and 40 forming a pair are connected to the bipolar discriminator 220a in a non-inverted state. That is, the bipolar discriminator 220a inputs common signals of c1', c2', c3, and c4 through one input terminal.

Meanwhile, the bipolar discriminator 220a and the DAQ board 100 are connected to each other through two trigger signal lines, a control signal generated in response to the common signals c1' and c2' inverted through one trigger signal line is input to a first trigger terminal of the DAQ board 100, and a control signal generated in response to the common signals c3 and c4 non-inverted through another trigger signal line are input to a second trigger terminal of the DAQ board 100.

Thus, the DAQ board 100 recognizes one of the first to fourth radiation detectors 10 to 40 according to whether the input signal is an inverted signal or a non-inverted signal and whether the control signal is input to the first trigger terminal or the second trigger terminal.

The recognizing process can be expressed in a table as follows.

| Type of Radiation Detector | Polarity of Input Signal | Polarity of Output Signal (Type of Trigger Terminal) |
| --- | --- | --- |
| First Radiation Detector | Inverted | Inverted (First Trigger) |
| Second Radiation Detector | Non-inverted | Inverted (First Trigger) |
| Third Radiation Detector | Non-inverted | Non-inverted (Second Trigger) |
| Fourth Radiation Detector | Inverted | Non-inverted (Second Trigger) |

The DAQ board 100 identifies a radiation detector according to the polarity of an input signal and the type of a trigger terminal as expressed in the above table, and accordingly after creating identifying information on the corresponding radiation detector, contains the input signal in the identifying information created in the digitalizing process to transmit the input signal to the computer 300.

The computer 300 receives a digital signal input from the DAQ board 100, and determines whether the digital signal is an output signal of the first radiation detector 10 or to an output signal of the fourth radiation detector 40 through identifying information contained in the digital signal.

Meanwhile, as another exemplary embodiment of the present invention, an inverter is installed in one of the plurality of output terminals in one radiation detector and an inverter is installed at an output terminal at another location in the other radiation detector forming a pair, so that a radiation detector is identified according to a location difference of output terminals of the two radiation detector whose output signals have different polarities.

The above-mentioned another embodiment of the present invention will be described in detail with reference to FIGS. 6 and 7.

Figure 6:
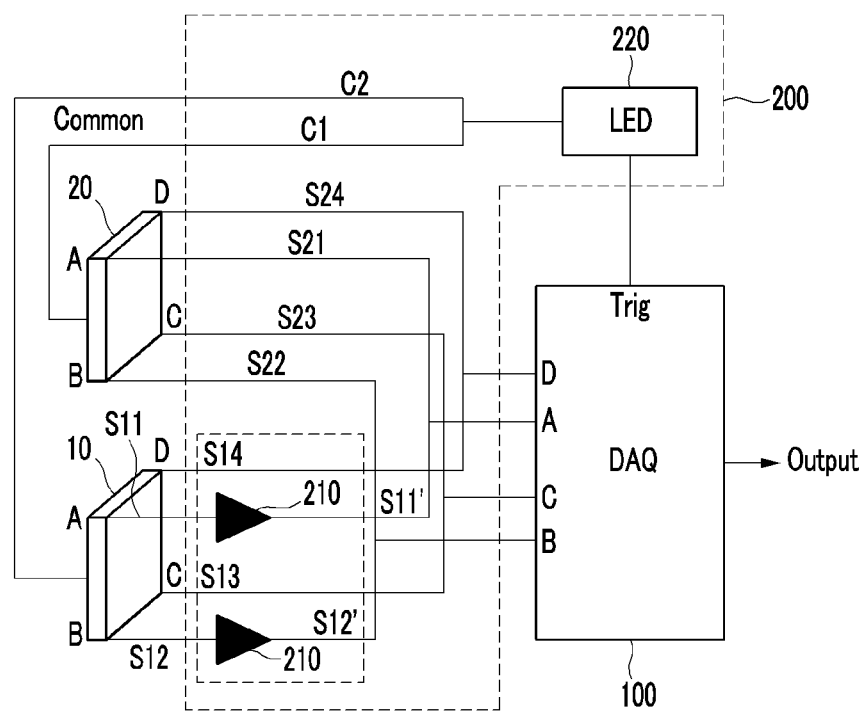
FIG. 6 is a detailed diagram of a radiation diagnosis apparatus according to a fourth exemplary embodiment of the present invention.

FIG. 6 is a detailed diagram of a radiation diagnosis apparatus according to a fourth exemplary embodiment of the present invention.

As shown in FIG. 6, the radiation diagnosis apparatus according to the fourth exemplary embodiment of the present invention includes first and second radiation detectors 10 and 20, a multiplexing unit 200 including a plurality of inverters 210 and one discriminator 220, and one data acquisition (DAQ) board 100. Here, the DAQ board 100 is an example of a data acquisition unit.

The configuration of the radiation diagnosis apparatus according to the fourth embodiment of the present invention is similar to that of the radiation diagnosis apparatus according to the first exemplary embodiment of the present invention.

However, the radiation diagnosis apparatus according to the fourth exemplary embodiment of the present invention is different from the first exemplary embodiment of the present invention in that two inverters 210 are installed on output wirings A and B of the output terminals A, B, C, and D.

According to the exemplary embodiment of the present invention, since the output terminals of the second radiation detector 20 generates output signals having a non-inverted polarity, it is easier in determining the polarity difference to output signals having an inverted polarity from the output terminals of the first radiation detector 10 as in the first exemplary embodiment of the present invention.

However, since output signals of the first radiation detector 10 are input to the discriminator 220 at the same time, even through at least one output signal of the four output signals of the first radiation detector 10 has an inverted polarity, it is possible to determine a polarity difference between the at least one output signal and the output signals of the second radiation detectors 20.

Moreover, as shown in FIG. 6, if signals of the four output signals of the first radiation detector 10 output from two adjacent output terminals have an inverted polarity, it is possible to more clearly determine a polarity difference between the output signals of the first radiation detector 10 and the second radiation detector 20.

As a result, according to FIG. 6, the DAQ board 100 determines the polarities of the output signals of the first or second radiation detector 10 or 20 input from the input terminals A, B, C, and D to determine that a signal input to the A input terminal and the B input terminal is an output signal of the first radiation detector if the signal has an inverted polarity. Of course, although FIG. 6 illustrates that an inverter is connected to the output terminals A and B, the present invention is not limited thereto but an inverter may be connected to B and C, C and D, A and D, A and C, one of A, B, C, and D, or three of A, B, C, and D.

Figure 7:
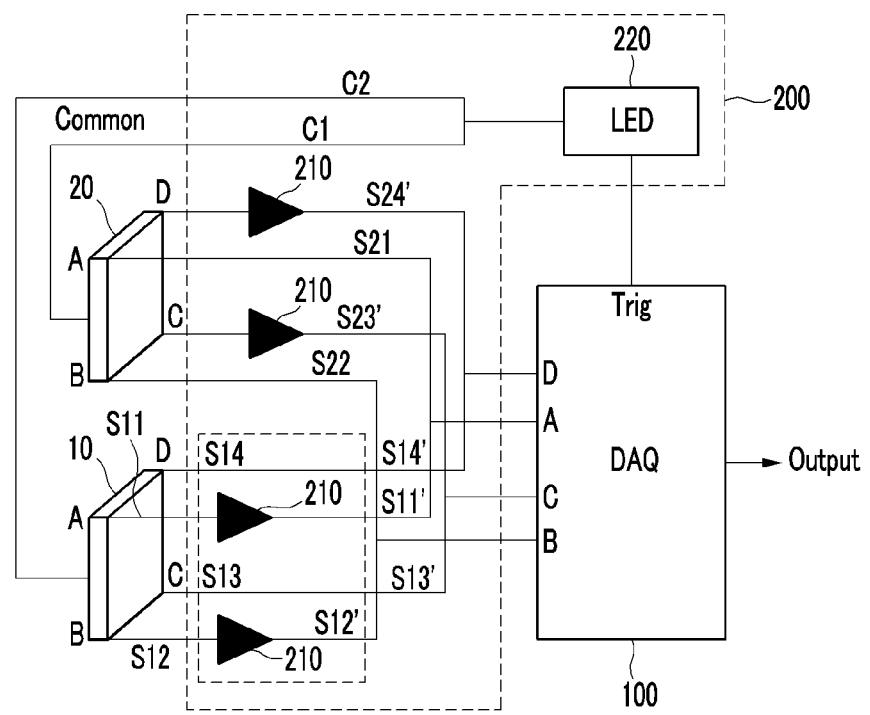
FIG. 7 is a detailed diagram of a radiation diagnosis apparatus according to a fifth exemplary embodiment of the present invention.

FIG. 7 is a detailed diagram of a radiation diagnosis apparatus according to a fifth exemplary embodiment of the present invention.

As shown in FIG. 7, the radiation diagnosis apparatus according to the fourth exemplary embodiment of the present invention includes first and second radiation detectors 10 and 20, a multiplexing unit 200 including a plurality of inverters and one discriminator 220, and a data acquisition (DAQ) board 100. Here, the DAQ board 100 is an example of a data acquisition unit.

The configuration of the radiation diagnosis apparatus according to the fifth embodiment of the present invention is similar to that of the radiation diagnosis apparatus according to the first exemplary embodiment of the present invention.

However, the radiation diagnosis apparatus according to the fifth exemplary embodiment of the present invention is different from the fourth exemplary embodiment of the present invention in that two of four inverters 210 are installed on output wirings A and B of the output terminals A, B, C, and D of the first radiation detector 10, and the remaining two inverters 210 are installed on output wirings C and D of the output terminals A, B, C, and D of the second radiation detector 20.

That is, the fifth exemplary embodiment of the present invention is distinguished in that an inverter is installed in a wiring of an output terminal of the first radiation detector 20.

In this case, in the fifth exemplary embodiment of the present invention, an output terminal installed when the inverter 210 is installed in the first and second radiation detectors 10 and 20 is different from those of the other exemplary embodiments of the present invention. That is, a type of an input terminal of the DAQ board to which the inverter 210 installed at an output terminal of the first radiation detector 10 is connected and a type of an input terminal of the DAQ board to which the inverter 210 installed at an output terminal of the second radiation detector 20 are different from each other.

A detailed example is as shown in FIG. 7. As shown in FIG. 7, the inverters 210 of the first radiation detector 10 are connected to output wirings of A and B output terminals connected to A and B input terminals of the DAQ board 100, respectively.

On the contrary, the inverters 210 of the second radiation detector 20 are connected to output wirings of C and D output terminals connected to C and D input terminals of the DAQ board 100.

In this case, the number of inverters 210 installed in the first radiation detector 10 may be not more than 3, and the number of inverters 210 installed in the second radiation detector 20 may also be not more than 3. However, output signals with an inverted polarity from the first radiation detector 10 and outputs signals with original polarity from the second radiation detector 20 or vice versa, are input to the input terminal of the same DAQ board 100 so that the DAQ board 100 can identify the radiation detectors 10 and 20 based on a polarity difference of output signals of the radiation detectors 10 and 20.

With reference to FIG. 7 as an example, if an inverted signal is input to the A and B input terminals, the DAQ board 100 determines that the input signal is an output signal of the first radiation detector 10, and if an inverted signal is input to the C and D input terminals, the DAQ board 100 determines that the input signal is an output signal of the second radiation detector 20.

Meanwhile, the fourth and fifth embodiments of the present invention may include four radiation detectors 10 to 40 like the third embodiment of the present invention. In this case, a configuration of the third embodiment of the present invention as an example is modified as follows.

Modification 1. Up to three inverters 210 are installed at four output terminals of a first radiation detector 10, and no inverter 210 is installed at four output terminals of a second radiation detector 20. Further, up to three inverters 210 are installed at four output terminals of a fourth radiation detector 40, and no inverter 210 is installed at four output terminals of a third radiation detector 30.

Modification 2. Up to three inverters are installed at four output terminals of a first radiation detector 10, and up to three inverters 210 are also installed at four output terminals of a second radiation detector 20. In this case, a type of an input terminal of the DAQ board to which an inverter 210 installed at an output terminal of the first radiation detector 10 and a type of an input terminal of the DAQ board to which an inverter 210 installed at an output terminal of the second radiation detector 20 are different from each other.

Up to three inverters 210 are installed at four output terminals of the fourth radiation detector 40, and up to three inverters 210 are also installed at four output terminals of the third radiation detector 30. In this case, a type of an input terminal of the DAQ board to which an inverter 210 installed at an output terminal of the fourth radiation detector 40 and a type of an input terminal of the DAQ board to which an inverter 210 installed at an output terminal of the third radiation detector 30 are different from each other.

Here, the number of inverters connected to the output terminals of the first and second detectors 10 and 20 may exceed N, but is preferably N for precise identification. Further, the number of inverters connected to the output terminals of the third and fourth detectors 30 and 40 may exceed N, but is preferably N for precise identification.

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 10, 20, 30, 40: | Radiation detector |
| 100: | Data acquisition unit, DAQ board |
| 200: | Multiplexing unit |
| 300: | Computer |

What is claimed is:

1. A radiation diagnosis apparatus, comprising:
   a first radiation detector for detecting a radiation and generating an output signal in response to the detection of the radiation;
   a second radiation detector for generating an output signal having a same polarity as that of the first radiation detector;
   an inverter formed at an output terminal of the first radiation detector to invert the polarity of the input output signal;
   a discriminator for receiving a common signal from the first and second radiation detector and outputting a control signal corresponding to the input common signal; and
   a data acquisition unit for converting an input signal to a digital signal according to the control signal while taking output signals of the plurality of inverters and the second radiation detector as inputs, and identifying an output signal of which detector of the first and second detectors the input signal is according to a polarity difference of the input signal.

2. The radiation diagnosis apparatus of claim 1, wherein: the first radiation detector and the second radiation detector are situated at adjacent locations.

3. The radiation diagnosis apparatus of claim 2, wherein: the data acquisition unit is a data acquisition (DAQ) board.

4. A radiation diagnosis apparatus, comprising:
   a first radiation detector for detecting a radiation and generating an output signal corresponding to the detection of the radiation;
   a second radiation detector for generating an output signal having a same polarity as that of the first radiation detector;
   an inverter formed at a common signal output terminal of the first radiation detector to invert the polarity of the input common signal;
   a bipolar discriminator for receiving a common signal from the inverter and the second radiation detector and outputting a control signal corresponding to a polarity difference of the input common signal; and
   a data acquisition unit for converting an input signal to a digital signal according to the control signal while taking output signals of the first and second radiation detectors as inputs, and identifying an output signal of which detector of the first and second detectors the input signal is according to a polarity difference of the common signal.

5. The radiation diagnosis apparatus of claim 4, wherein: the first radiation detector and the second radiation detector are situated at adjacent locations.

6. The radiation diagnosis apparatus of claim 5, wherein: the data acquisition unit is a data acquisition (DAQ) board.

7. The radiation diagnosis apparatus of claim 4, wherein: the bipolar discriminator is connected to the data acquisition unit through two signal lines to provide a control signal corresponding to a common signal of the first radiation detector whose polarity is inverted through one of the signal lines and provide a control signal corresponding to a common signal of the second radiation detector whose polarity is non-inverted through the other signal line.

8. The radiation diagnosis apparatus of claim 6, wherein: if the DAQ board identifies a detector corresponding to the input signal, the DAQ board contains identifying information representing the identified detector in the digital signal to output the identifying information.

9. The radiation diagnosis apparatus of claim 1, wherein: the inverter is connected to at least one of N output terminals of the first radiation detector.

10. The radiation diagnosis apparatus of claim 1, wherein: the inverter is at least one inverter connected to up to N-1 output terminals of the N output terminals of the first radiation detector.

11. The radiation diagnosis apparatus of claim 10, further comprising:
    at least one inverter connected to up to N-1 output terminals of the N output terminals of the second radiation detector,
    wherein the inverter connected to the output terminal of the second radiation detector is connected to an input terminal of the data acquisition unit through a signal line different from that of the inverter connected to the output terminal of the first radiation detector.

12. The radiation diagnosis apparatus of claim 11, wherein: the sum of the number of the inverters connected to the output terminal of the first radiation detector and the number of the inverters connected to the output terminal of the second radiation detector is two or more and N or less.

13. A radiation diagnosis apparatus, comprising:
    a first radiation detector for detecting a radiation and generating an output signal corresponding to the detection of the radiation;
    a second radiation detector for generating an output signal whose polarity is the same as that of the first radiation detector;
    a first inverter formed at a plurality of output terminals of the first radiation detector to invert the polarity of the input output signal;

third and fourth radiation detectors for generating output signals whose polarity is the same as that of the first radiation detector;

a second inverter formed at a plurality of output terminals of the third radiation detector to invert the polarity of the input output signal;

a third inverter formed at a common signal output terminal of the first and second radiation detectors to invert the polarity of the common signal of the first and second radiation detectors;

a bipolar discriminator for receiving a common signal from the third inverter and the third and fourth radiation detectors through one input terminal and outputting a control signal corresponding to a polarity difference of the input common signal; and a data acquisition unit for converting an input signal to a digital signal while taking output signals of the first and second inverters and the third and fourth radiation detectors, and identifying an output signal of which detector of the first to fourth radiation detectors the input signal is based on a polarity difference of the common signal and a polarity difference of the input signal.

14. The radiation diagnosis apparatus of claim 13, wherein: at least two of the first to fourth radiation detectors are situated at adjacent locations.

15. The radiation diagnosis apparatus of claim 13, wherein: the data acquisition unit is a data acquisition (DAQ) board.

16. The radiation diagnosis apparatus of claim 15, wherein: the bipolar discriminator is connected to the data acquisition unit through two signal lines to provide a control signal corresponding to the common signal whose polarity is inverted through one of the signal lines and provide a control signal corresponding to the common signal whose polarity is non-inverted through the other signal line.

17. The radiation diagnosis apparatus of claim 16, wherein: The DAQ board contains identifying information representing the identified radiation detector in the digital signal to output the identifying information.

18. The radiation diagnosis apparatus of claim 13, wherein: the first inverter is connected to at least one of N output terminals of the first radiation detector, and the second inverter is connected to at least one of N output terminals of the third radiation detector.

19. The radiation diagnosis apparatus of claim 13, wherein: the first inverter is at least one inverter connected to up to N-1 output terminals of the N output terminals of the first radiation detector.

20. The radiation diagnosis apparatus of claim 13, wherein the second inverter at least one inverter connected to up to N-1 output terminals of the N output terminals of the third radiation detector.

21. The radiation diagnosis apparatus of claim 19, further comprising:

at least one inverter connected to up to N-1 output terminals of the N output terminals of the second radiation detector, wherein the inverter connected to the output terminal of the second radiation detector is connected to an input terminal of the data acquisition unit through a signal line different from that of the inverter connected to the output terminal of the first radiation detector.

22. The radiation diagnosis apparatus of claim 19, further comprising:

at least one inverter connected to up to N-1 output terminals of the N output terminals of the fourth radiation detector, wherein the inverter connected to an output terminal of the fourth radiation detector is connected to an input terminal of the data acquisition unit through a signal line different from that of the inverter connected to the output terminal of the third radiation detector.

\* \* \* \* \*